(12) United States Patent
Gurr

(10) Patent No.: US 6,433,289 B1
(45) Date of Patent: Aug. 13, 2002

(54) WEIGHING DEVICE

(75) Inventor: Wayne O. Gurr, Brandon (CA)

(73) Assignee: Scaleco, Brandon (CA)

( * ) Notice: Subject to any disclaimer, the term of this patent is extended or adjusted under 35 U.S.C. 154(b) by 0 days.

(21) Appl. No.: 09/425,009

(22) Filed: Oct. 25, 1999

(51) Int. Cl.[7] .............................................. G01G 21/28
(52) U.S. Cl. ................... 177/238; 177/243; 177/DIG. 9
(58) Field of Search ................................ 177/132, 133, 177/134, 135, 199, 201, 202, 207, 238, 239, 240, 241, 255, 261, DIG. 9, 124, 154, 155, 156, 184, 187, 189

(56) References Cited

U.S. PATENT DOCUMENTS

| | | | | |
|---|---|---|---|---|
| 3,301,341 A | * | 1/1967 | Fathauer ...................... | 177/133 |
| 3,444,943 A | * | 5/1969 | Tytus .......................... | 177/238 |
| 3,490,554 A | * | 1/1970 | Schellentrager ............. | 177/133 |
| 3,526,286 A | * | 9/1970 | Flinth ......................... | 177/132 |
| 3,915,248 A | * | 10/1975 | Paelian ....................... | 177/255 |
| 4,411,327 A | * | 10/1983 | Lockery et al. ............. | 177/211 |
| 4,596,297 A | * | 6/1986 | Skibinski .................... | 177/132 |
| 4,804,053 A | * | 2/1989 | Nordstrom ................... | 177/255 |
| 5,801,339 A | * | 9/1998 | Boult .......................... | 177/261 |

* cited by examiner

Primary Examiner—Randy W. Gibson
(74) Attorney, Agent, or Firm—Adrian D. Battison

(57) ABSTRACT

A housing for receiving a load cell comprises a base plate for supporting the load cell on a supporting surface, outer walls extending upwards from the base plate defining an enclosure, an area within the outer walls for receiving the load cell and a removable top section on the outer walls arranged to enclose the load cell within the area of the housing. An outer ring is arranged to be positioned around the load cell within the outer walls such that the load cell is centered therein. A receiving portion for receiving a load and a weight dispersing means within the enclosure such that the load received on the receiving portion is balanced on the load cell. The weight dispersing means comprises a lower detachable cup removably connected to the load cell within the enclosure, an upper detachable cup removably connected to the receiving portion partially within the enclosure located directly above the lower cup, each cup having a concaved face and a ball positioned between the cups engaged within the concaved face of each cup within the housing.

9 Claims, 4 Drawing Sheets

WEIGHING DEVICE

BACKGROUND OF THE INVENTION

Typically, weighing large items such as trucks including trailers, farm equipment and the like requires a relatively large platform in which at least one scale is positioned at the platform and weighs the vehicle. A problem with the common scale is that the exposure of an electronic receiving element to environmental hazards, for example moisture and chemical contact, as well as dust, ice, falling objects and weight impact. The common scale does not protect the load receiving element from external power sources such as lightning or welding ground leakage.

SUMMARY OF THE INVENTION

The present invention is designed to be self-centering which ensures that the load applied is not read inaccurately due to deflection by the mechanism being weighed. The invention is self dampening to check lateral forces with a minimum mechanical stress and is user friendly allowing for easy access for service. A low profile unit that allows for the lowest center of gravity possible and that has the same appearance and weighing integrity throughout the weight ranges from 2200 kg to 50,000 kg per weighing element. An electronic load receiving element of the present invention is totally enclosed in a moisture tight structure. The structure can be filled with a 20 grade non-detergent oil to a depth exceeding the load element depth to give a complete moisture seal. The mechanical structure housing the electronic load element is designed to resist impact equal to the shear strength of 2½" foundation mounting bolts. Should the impact reach this breaking point the bolts would shear allowing the structure to dissipate the energy without significant damage to the electronic load element. The connection between the load receiving element and the load bearing platform is accomplished by inserting a phenolic cup between the surfaces. This acts as an insulator to protect the load receiving element against power sources coming from the load bearing platform. By utilising a ball and cup assembly the unit applies pressure from the load bearing surface to the electronic load receiving element in a vertical direction at all times. This remains constant even if the load bearing surface is subject to deflection. By using the specially designed load cup with the vertical dampening ring eliminates the necessity for bumper checks to resists lateral movement through 360 degrees. Using the radius design of the load cup supported by the ball is in itself a dampener. The more load applied the more resistance generated to resist lateral movement. The present invention requires no mechanical connection between the load bearing surface and the electronic load receiving element. This makes for easy access when maintenance is required. The complete elevation of 6.25" for the largest units makes the present invention one of the lowest profile weighing components in the various size ranges. The present invention has the same appearance throughout the complete size range. The only noticeable change is in the physical size.

According to one aspect of the invention there is provided a housing for receiving a load cell comprising;

a base plate for receiving a load cell;

a weight dispersing means for use with the load cell so that a load is balanced;

an enclosure which surrounds the load cell therein from the base plate to the weight dispersing means;

and a receiving portion for receiving the load.

Preferably the enclosure has an outer wall which surrounds the cell, the outer wall extends generally vertically from the base plate.

Preferably the enclosure has an outer wall which surrounds the cell, the outer wall extends generally vertically from the base plate providing an area between the base plate and the weight dispersing means for enclosing the load cell therein, a cap is attached to a top end of the outer wall and has an opening located directly above the weight dispersing means which cap allows a top portion of the weight dispersing means to protrude from the enclosure so that the receiving portion can be attached thereto and wherein the cap has a guiding arrangement for limiting the movement of the weight dispersing means.

Preferably the weight dispersing means has a first receptacle mounted on the load cell, the receptacle is cylindrical in shape and has a vertical axis, a first side of the receptacle faces downward engaging the load cell, a second side opposite the first side faces upwardly, the second side has a concave center and an outer ledge located about the axis, wherein a second receptacle being cylindrical in shape has a second vertical axis which extends coaxially with the first vertical axis of the first receptacle, a first side of the second receptacle faces upwardly and a second side faces downward and has a concave center and an outer ledge located about the axis, and wherein a sphere is located between the each concave centers such that the center of the sphere is substantially located on the vertical axis, the sphere is arranged to move between each receptacle within each concave such that as a load is placed on the receiving portion downward force is applied to the sphere which balances the load within the enclosure by moving within each concave secured by each outer ledge.

Preferably the load cell is attached to a securing means which stabilizes the load cell within the enclosure, the enclosure has an outer wall which surrounds the cell, the outer wall extends generally vertically from the base plate in which the securing means engages, the securing means includes a ring plate in which the load cell is attached, the plate is placed onto the base plate within the enclosure and engages the outer wall.

Preferably a cover is placed on the enclosure so that the housing substantially resists elements such as water, dirt and the like, the cove.

Preferably a spark retarding material is located within the housing so that the load cell is surrounded by the material to prevent a spark emitted from the load cell to exit the housing.

Preferably the receiving portion has a disk which is mounted onto the weight dispersing means, the disk is arranged to fit within a sleeve located on a second disk, the sleeve has an insulating material in which the disk engages to prevent an electrical surge to damage the load cell.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
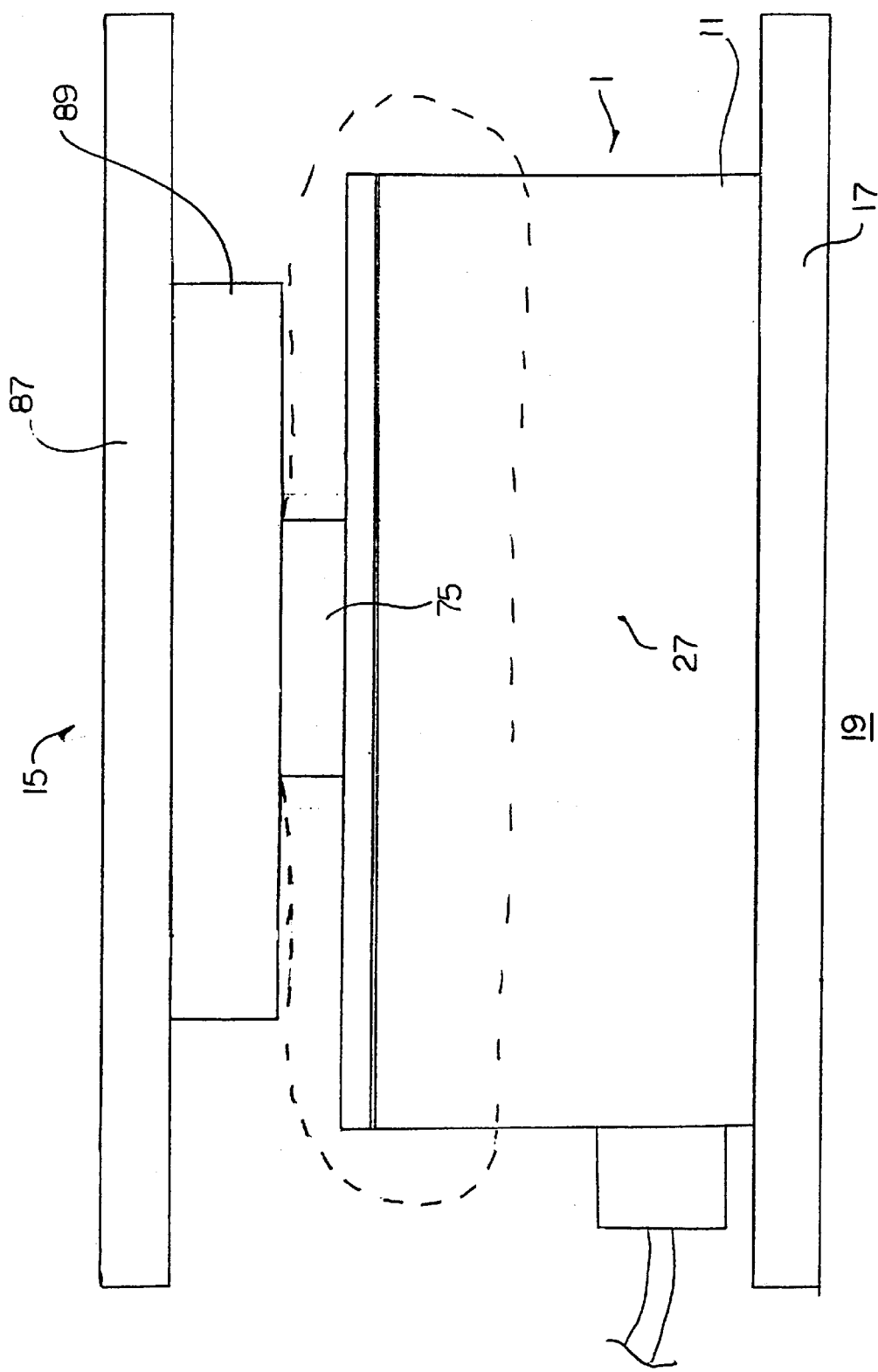
FIG. 1 is a side elevational view of the present invention.
Figure 2:
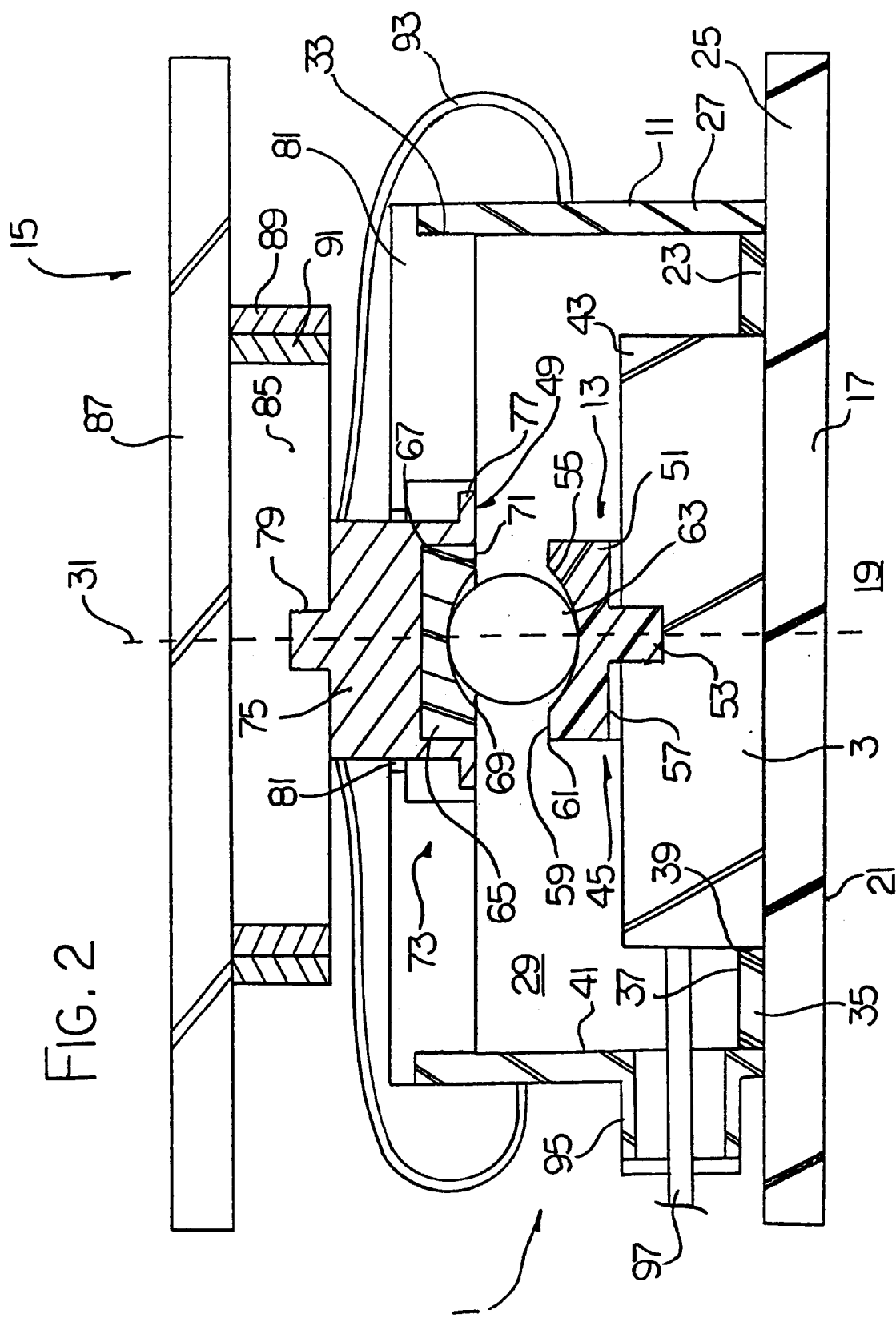
FIG. 2 is a vertical cross section of the present invention along the lines 2—2 in FIG. 1.
Figure 3:
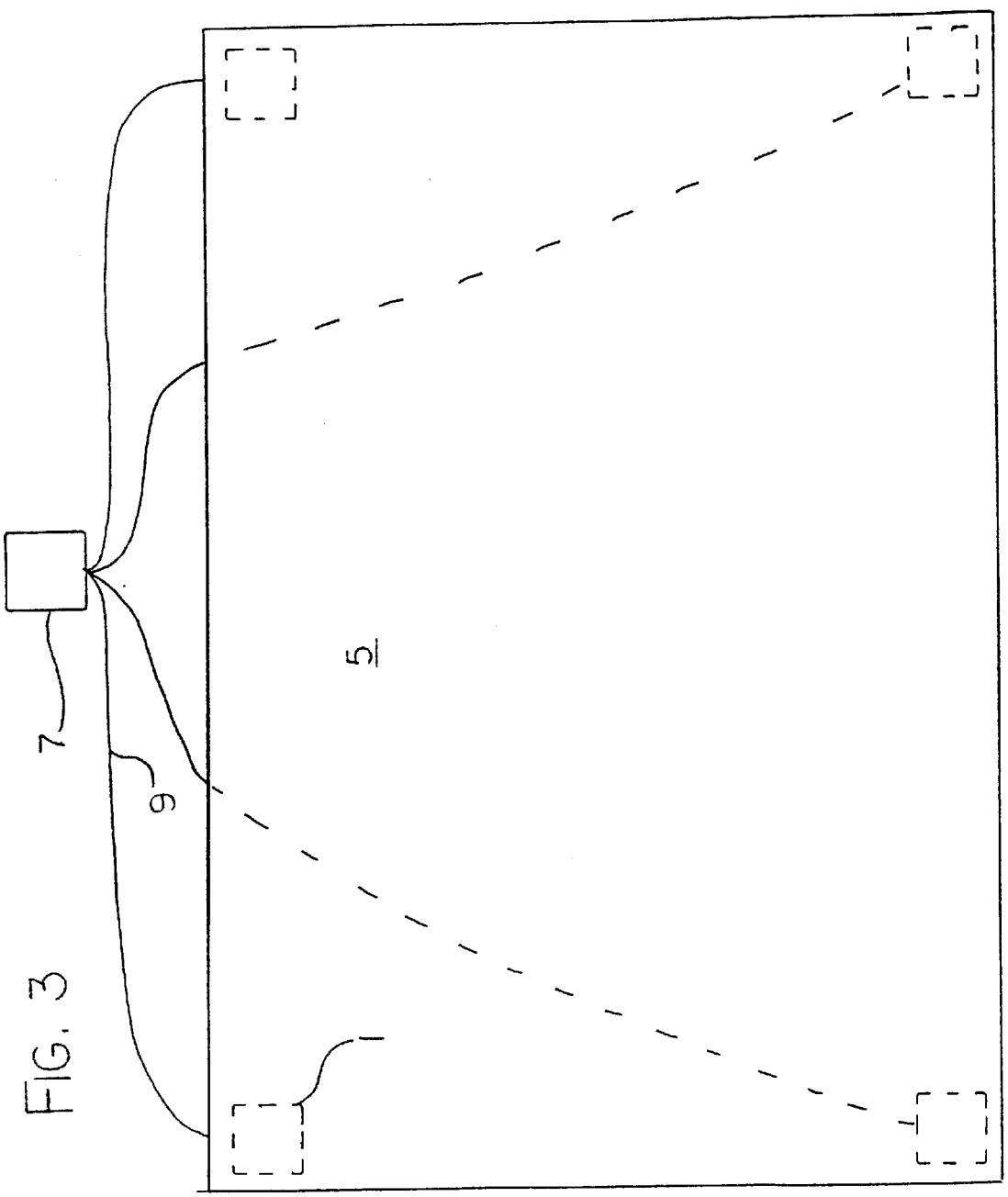
FIG. 3 is schematic view of the present invention.
Figure 4:
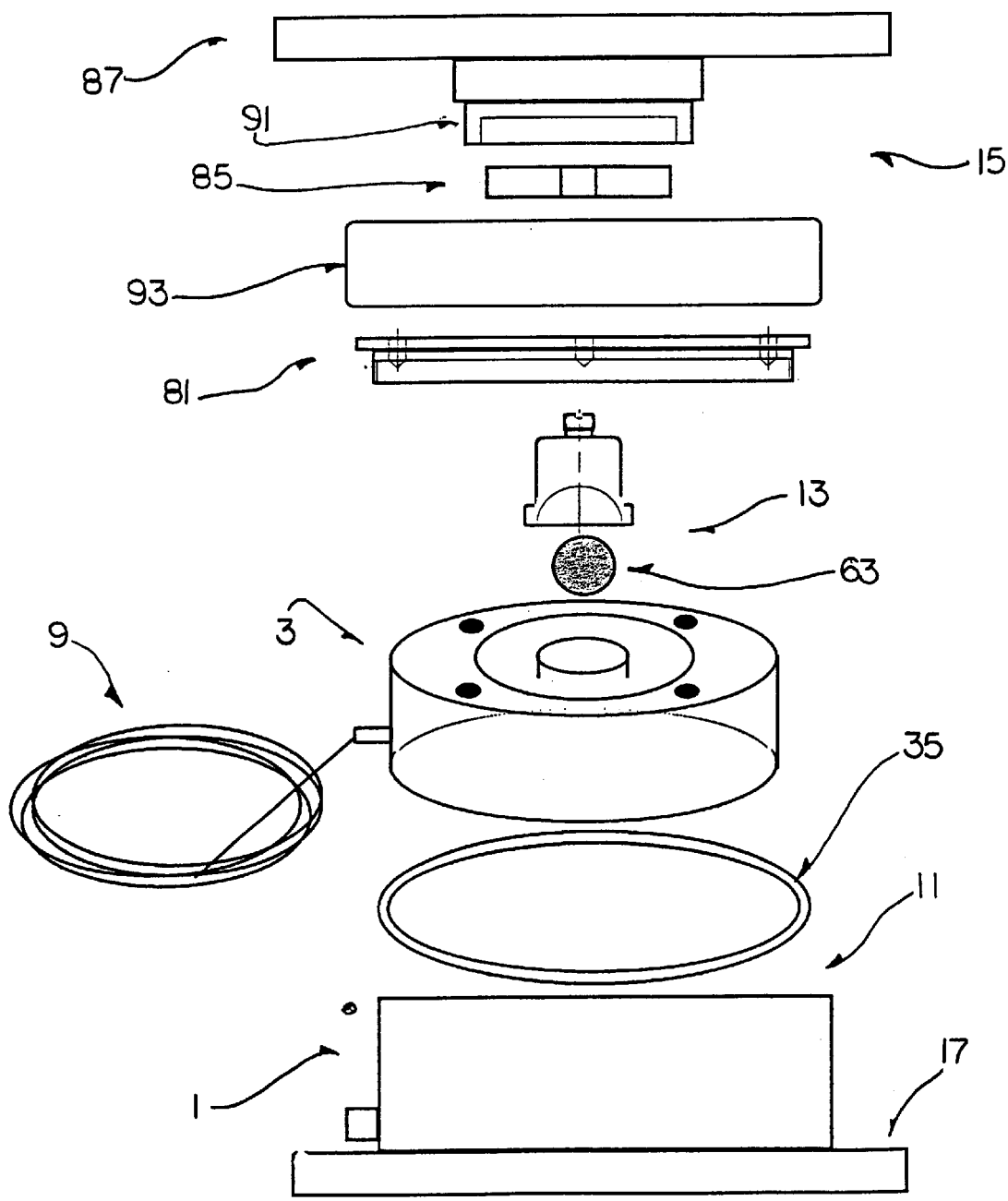
FIG. 4 is an exploded view of the present invention.

A housing 1 for a load cell 3 is arranged to provide protection for the cell for the elements and the like. The housing is designed to be located beneath a platform 5, as shown in FIG. 3, such that a plurality of housings are located at specific positions so that the weight of a truck or the like is evenly distributed on each of the housing for a correct reading of the weight. The platform is positioned on the ground with the housings located beneath so that trucks and the like can drive up onto the platform. Each housing has a load cell located therein and each load cell takes a separate reading of the weight and relays the weight to the station 7 through a series of wires 9. The housing has an arrangement which centers the weight within the housing so that added tools such as check rods are not needed to stabilize and center the weight manually.

The housing comprises an enclosure 11, a weight dispersing means 13 and a top portion 15 for receiving a load. The housing including the enclosure, weight dispersing means and top portion are located on a base plate 17 which is arranged to be attached to a surface 19 such as the ground or a sufficient supporting surface. The base plate is flat such that a first side 21 is arranged to engage the surface and a second side 23 is arranged to support the housing. The base plate is substantially larger in width than the housing providing a flange 25 for attaching to the surface.

The enclosure is directly mounted to the base plate and comprises an outer wall 27 which extends generally upwardly from the base plate creating an open area 29 within the enclosure so that the load cell is substantially enclosed by the outer wall within the enclosure. The outer wall is a cylindrical member having a vertical axis 31 extending upwardly from the base plate and has a threaded inner top end 33.

The load cell is supported within the housing by a securing means 35 which stabilizes the load cell within the enclosure. The securing means is a plate 37 which is located about an outer side 39 of the load cell and is arranged to fit tightly into the enclosure and engage an inner side 41 of the outer wall.

The weight dispersing means is located at a top side 43 of the load cell and extends upwardly along the vertical axis 31. The weight dispersing means comprises a bottom portion 45, and middle portion 47 and a top portion 49. The bottom portion is directly mounted to the load cell. A first receptacle 51 has a threaded shaft 53 which is fastened into the load cell such that the shaft extends along the vertical axis. The receptacle is bowl shaped such that first side 57 is flat being adjacent to the load cell in which the threaded shaft extends outwardly and a second side 59 opposite the first side wherein a concave 55 is located. The concave has a center which is located on the axis and an outer edge 61 located about the axis equidistantly spaced from the center. The concave is arranged receive a ball 63 which is appropriately sized so that the ball fits into the concave and is able to move about the axis therein, which defines the middle portion.

The top portion comprises a second receptacle 65 which is located on a respective side of the ball relative to the first concave. The second receptacle has a first side 67 which has a concave 69 that faces the concave 55 on the first receptacle, the concave has a centre which is located on the axis and an outer ledge 71 located about the axis. The second concave is arranged to receive the ball 63 such that the first concave and the second concave face inwards so that he ball is support between the first and second concave so that the ball is able to move slightly within the concave about the axis. The second receptacle has a second side 59 which is flat and faces upwardly, and is mounted into a guide portion 73.

The guide portion comprises a main body 75, an outer lip 77 and a threaded shaft 79 extending generally upwardly along the axis from the main body. A cap 81 is screwed into the threaded top end of the outer wall which is arranged to cover the enclosure. The cap has a hole 83 located about the axis in which the main body of the top portion is positioned and is arranged to support the main body therein. The outer lip at the bottom end of the main body corresponds with a top lip on the cap at the hole to keep the main body situated within the enclosure at the hole and allows slight horizontal movement about the axis of the guide means.

A disk 85 is tightened onto the threaded top end for receiving a load plate 87 thereon. The load plate is generally parallel to the base plate and is relatively the same size. A sleeve 89 on the bottom side of the load plate is arranged to receive the disk and is insulated along the inner edge by a insulation material 91 defining a phenolic cup which protects the load cell from power surges and the like. The load plate is mounted to the platform, as mentioned earlier, A cover 93 is placed around the hole and extends to the enclosure for creating a seal around the housing to protect the load cell from dirt, elements and the like.

In operation, a load is placed onto the platform, as the force of the load pushes onto the housing, the ball is able to balance the load by moving within the concave on the first and second receptacle which eliminates the need for extra balancing by tools and keeps the weight of the load centred on the load cell.

The enclosure is arranged to receive a spark retarding substance which eliminates any distribution of sparks omitted from a shorted load cell or any such circumstance. The spark retarding substance allows the enclosure to be positioned in flammable areas without fear of sparks being emitted therefrom.

An electrical outlet 95 is located at the outer wall to allow access by a cord 97 to power the load cell and to relay the weight to the station.

The present invention is designed to be self-centering which ensures that the load applied is not read inaccurately due to deflection by the mechanism being weighed. The invention is self dampening to check lateral forces with a minimum mechanical stress and is user friendly allowing for easy access for service. A low profile unit that allows for the lowest center of gravity possible and that has the same appearance and weighing integrity throughout the weight ranges from 2200 kg to 50,000 kg per weighing element. An electronic load receiving element of the present invention is totally enclosed in a moisture tight structure. The structure can be filled with a 20 grade non-detergent oil to a depth exceeding the load element depth to give a complete moisture seal. The mechanical structure housing the electronic load element is designed to resist impact equal to the shear strength of 2½" foundation mounting bolts. Should the impact reach this breaking point the bolts would shear allowing the structure to dissipate the energy without significant damage to the electronic load element. The connection between the load receiving element and the load bearing platform is accomplished by inserting a phenolic cup between the surfaces. This acts as an insulator to protect the load receiving element against power sources coming from the load bearing platform. By utilizing a ball and cup assembly the unit applies pressure from the load bearing surface to the electronic load receiving element in a vertical direction at all times. This remains constant even if the load bearing surface is subject to deflection. By using the specially designed load cup with the vertical dampening ring eliminates the necessity for bumper checks to resists lateral movement through 360 degrees. Using the radius design of the load cup supported by the ball is in itself a dampener. The more load applied the more resistance generated to resist lateral movement. The present invention requires no mechanical connection between the load bearing surface and the electronic load receiving element. This makes for easy access when maintenance is required. The complete elevation of 6.25" for the largest units makes the present invention one of the lowest profile weighing components in the various size ranges. The present invention has the same appearance throughout the complete size range. The only noticeable change is in the physical size.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A load cell apparatus comprising;
   a load cell;
   a base plate supporting the load cell on a supporting surface;
   outer walls extending upwards from the base plate defining an enclosure;
   an area within the outer walls receiving the load cell;
   a removable top section on the outer walls enclosing the load cell within the area of the housing;
   an outer ring positioned around the load cell within the outer walls such that the load cell is centered therein;
   a receiving portion for receiving a load and,
   a weight dispersing means within the enclosure such that the load received on the receiving portion is balanced on the load cell;
      wherein the weight dispersing means comprises a lower detachable cup removably connected to the load cell within the enclosure, an upper detachable cup removably connected to the receiving portion partially within the enclosure located directly above the lower cup, each cup having a concave face and a ball positioned between the cups engaged within the concave face of each cup within the housing.

2. The apparatus according to claim 1 wherein the enclosure has an outer wall which surrounds the cell, the outer wall extends generally vertically from the base plate.

3. The apparatus according to claim 1 wherein the enclosure has an outer wall which surrounds the cell, the outer wall extends generally vertically from the base plate providing an area between the base plate and the weight dispersing means for enclosing the load cell therein, a cap is attached to a top end of the outer wall and has an opening located directly above the weight dispersing means which cap allows a top portion of the weight dispersing means to protrude from the enclosure so that the receiving portion can be attached thereto and wherein the cap has a guiding arrangement for limiting the movement of the weight dispersing means.

4. The apparatus according to claim 1 wherein the weight dispersing means has a first receptacle mounted on the load cell, the receptacle is cylindrical in shape and has a vertical axis, a first side of the receptacle faces downward engaging the load cell, a second side opposite the first side faces upwardly, the second side has a concave centre and an outer ledge located about the axis, wherein a second receptacle being cylindrical in shape has a second vertical axis which extends coaxially with the first vertical axis of the first receptacle, a first side of the second receptacle faces upwardly and a second side faces downward and has a concave center and an outer ledge located about the axis, and wherein a sphere is located between the each concave centers such that the center of the sphere is substantially located on the vertical axis, the sphere is arranged to move between each receptacle within each concave such that as a load is placed on the receiving portion downward force is applied to the sphere which balances the load within the enclosure by moving within each concave secured by each outer edge.

5. The apparatus according to claim 1 wherein the load cell is attached to a securing means which stabilises the load cell within the enclosure, the enclosure has an outer wall which surrounds the cell, the outer wall extends generally vertically from the base plate in which the securing means engages, the securing means includes a ring plate in which the load cell is attached, the plate is placed onto the base plate within the enclosure and engages the outer wall.

6. The apparatus according to claim 1 wherein there is provided a sealing bag surrounding the enclosure which extends from a bottom edge of the sealing bag which engages an outer side of the outer wall below the removable top section to a top edge of the sealing bag which engages an exposed section of the weight dispersing means at the receiving portion above the removable top section.

7. The apparatus according to claim 1 wherein a spark retarding material is located within the housing so that the load cell is surrounded by the material to prevent a spark emitted from the load cell to exit the housing.

8. The apparatus according to claim 1 wherein the receiving portion has a disk which is mounted onto the weight dispersing means, the disk is arranged to fit within a sleeve located on a second disk, the sleeve has an insulating material in which the disk engages to prevent an electrical surge to damage the load cell.

9. A load cell apparatus comprising;
   a load cell;
   a base plate supporting the load cell on a supporting surface;
   outer walls extending upwards from the base plate defining an enclosure;
   an area within the outer walls receiving the load cell;
   a removable top section on the outer walls enclosing the load cell within the area of the housing;
   a receiving portion for receiving a load;
   a weight dispersing means within the enclosure such that the load received on the receiving portion is balanced on the load cell; and,
   a sealing bag surrounding the enclosure which extends from a bottom edge of the sealing bag which engages an outer side of the outer wall below the removable top section to a top edge of the sealing bag which engages an exposed section of the weight dispersing means at the receiving portion above the removable top section.

* * * * *